Feb. 7, 1956 E. M. SORENG ET AL 2,734,153
SOLENOID WITH PLUNGER
Filed Feb. 19, 1952 2 Sheets-Sheet 1
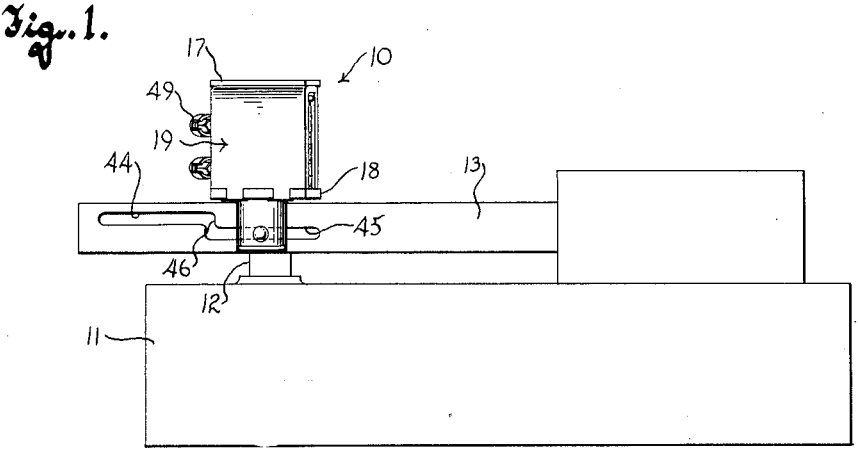
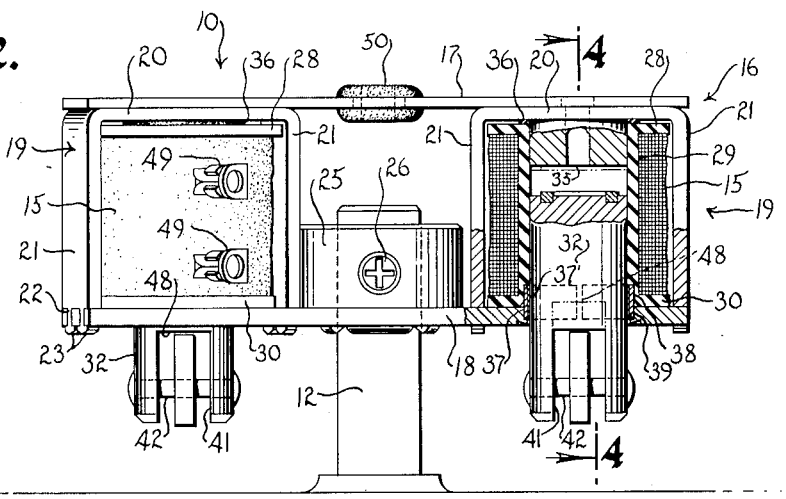
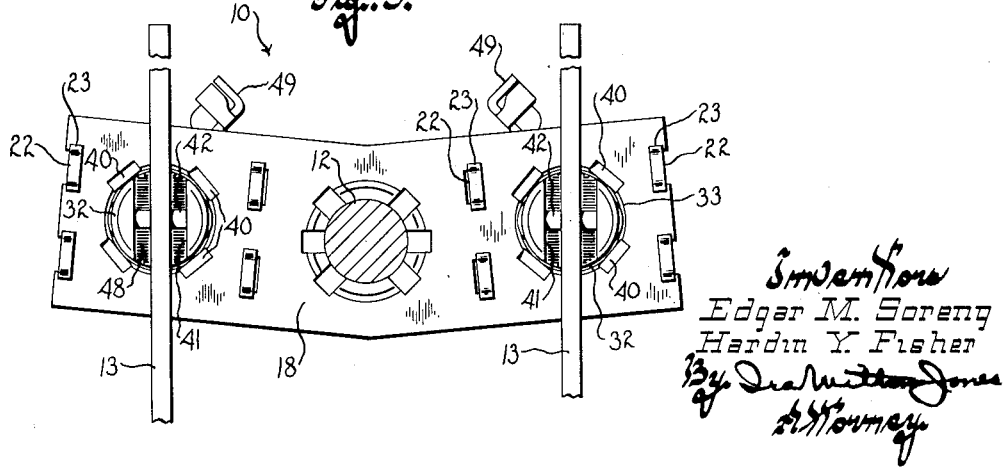

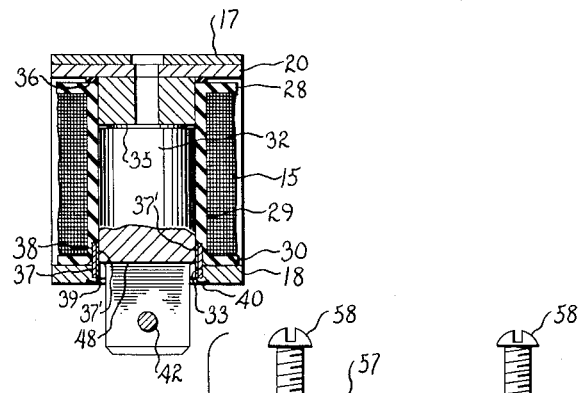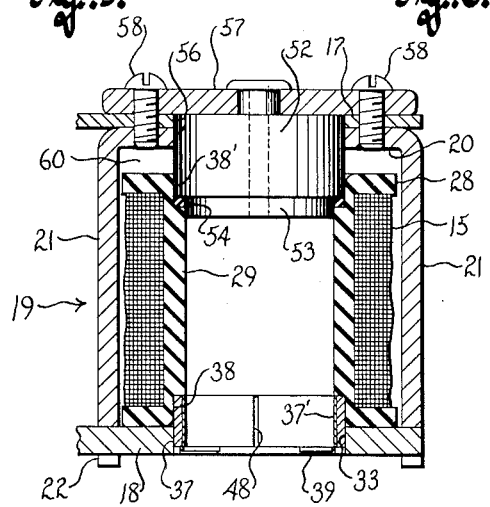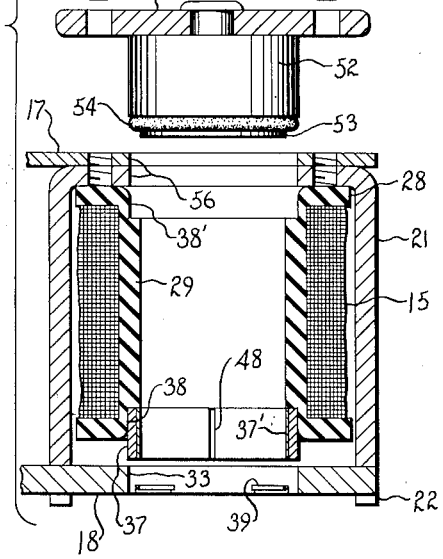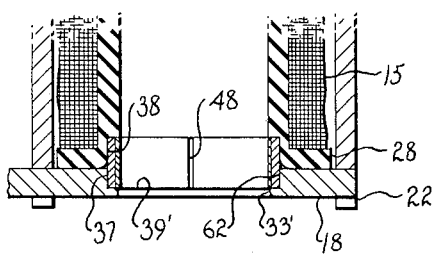

United States Patent Office 2,734,153
Patented Feb. 7, 1956

2,734,153

SOLENOID WITH PLUNGER

Edgar M. Soreng, Skokie, and Hardin Y. Fisher, Hillside, Ill., assignors, by mesne assignments, to Soreng Products Corporation, a corporation of Delaware Application February 19, 1952, Serial No. 272,404

3 Claims. (Cl. 317—191)

This invention relates to improvements in solenoids generally, and has more particular reference to a solenoid of the type which is especially suited for use as a coupling device through which motion may be transmitted from a constantly moving driver to a control element governing a mechanism to be controlled.

One of the most common uses for solenoids of this type is in connection with the shifting of transmission gearing on automatically controlled mechanisms such as washing machines. In such service the solenoid is mounted on a vertical oscillating shaft with its plunger slidable up and down on an axis parallel to that of the oscillating shaft but spaced radially therefrom. The plunger normally projects downwardly from its coil for connection with a shift rod and is adapted to actuate the shift rod in one direction when the plunger is in its downward retracted (deenergized) position, in consequence of oscillation of the solenoid with the shaft, and to actuate the control rod in the opposite direction in consequence of oscillation of the solenoid with the shaft when the plunger is in its attracted position.

As is usual practice the coil is wound upon a bobbin of insulative material, such as Bakelite, and is supported on a magnetically permeable frame with the tubular core of the bobbin on a vertical axis, and the plunger projecting downwardly therefrom through an opening in the underside of the frame. The hollow core of the bobbin comprises the plunger guide, but in the past the bobbin core was subjected to damage by the plunger in consequence of the sidewise forces exerted thereon during actuation of the shift rod by the reciprocating solenoid.

One of the main purposes of this invention, therefore, resides in the provision of a solenoid of the character described in which a metallic bushing confined in the hollow core of the bobbin and connected with the frame adjacent to the plunger opening therein serves as a bearing in which the plunger reciprocates and protects the core of the bobbin against damage resulting from the application of sidewise forces on the plunger by carrying such forces into the frame.

More specifically it is a purpose of this invention to provide a solenoid of the character described in which a bushing for the plunger carried conjointly by the bobbin, in a counterbore therein, and the frame of the solenoid cooperates with the bobbin core to guide the endwise sliding motion of the plunger in the bobbin.

Another purpose of this invention resides in the provision of a solenoid of the character described featuring an improved construction for the coil and particularly the bobbin upon which it is wound, and by which the coil can be installed on the frame of the solenoid with either end uppermost to facilitate replacement of the coils in the field in case they burn out.

In this connection it is a further purpose of this invention to provide a bobbin with counterbores opening to the opposite ends thereof so that the metallic bushing in which the plunger reciprocates can be inserted into either end of the bobbin by a service man in the field at the time of replacement of a burned out coil; and to provide a novel detachable end stop for the plunger which normally seats in the counterbore at the upper end of the bobbin and which cooperates with the bushing to hold the bobbin against shifting on the frame.

In solenoids of the type here under consideration, it is essential that the lower end of the plunger have a relatively wide and deep diametrical slot therein to accommodate the shift rod of the mechanism to be controlled, and the axial depth of this slot is such that the bottom thereof is disposed inwardly of the frame in the attracted position of the plunger. This, of course, has the effect of creating a flux bottleneck in the magnetic circuit through the plunger and the frame which limits the transfer of flux into the plunger from the portions of the frame surrounding the plunger bifurcations.

With this objection in mind it is another purpose of this invention to provide a solenoid of the character described wherein the bushing in which the plunger slides is made of magnetic metal and extends axially into the bobbin core far enough to transmit flux from the frame directly into the unslotted portions of the plunger inwardly of the wide and deep slot therein. With such a bushing of magnetic material, therefore, the reluctance of the magnetic circuit through the frame and plunger is held to a desirable minimum and there is no tendency for the flux density to exceed the saturation value of the bifurcated end of the plunger as would occur without the bushing.

With the above and other objects in view, which will appear as the description proceeds, this invention resides in the novel construction and arrangement of parts substantially as hereinafter described, and more particularly defined by the appended claims, it being understood that such changes in the precise embodiment of the hereinafter disclosed invention may be made as come within the scope of the claims.

The accompanying drawings illustrate several complete examples of the physical embodiment of the invention constructed in accordance with the best modes so far devised for the practical application of the principles thereof, and in which:

Figure 1 is an elevational view illustrating the application of the electromagnetic control instrumentality of this invention to a transmission to control the shifting of the gears thereof, viewing the control instrumentality from one end;

Figure 2 is an enlarged elevational view of the electromagnetic control instrumentality shown in Figure 1, viewing the same from the side, and with portions shown in section;

Figure 3 is a bottom view of the instrumentality shown in Figure 2;

Figure 4 is a sectional view through one of the solenoids taken along the plane of the line 4—4 in Figure 2 and showing the plunger thereof in its attracted position;

Figure 5 is an enlarged view similar to Figure 4 but showing a modified embodiment of the invention;

Figure 6 is a view similar to Figure 5 illustrating the manner in which the coil may be detached from the solenoid frame; and Figure 7 is a fragmentary sectional view illustrating another embodiment of the invention.

Referring now particularly to the accompanying drawings in which like numerals indicate like parts throughout the views, the numeral 10 generally designates an electromagnetic control instrumentality of the type known in the trade as a wigwag solenoid. This type of instrumentality usually has two substantially identical coils 15, and in its application to the transmission 11 of a washing machine, for instance, it is fixed upon a vertical shaft 12. This shaft is constantly oscillated by a prime mover, not shown, and the shifting of the transmission gears is effected by a shift lever or rod to which the shaft is coupled by the electromagnetic control device of this invention.

The two coils 15 are mounted upon the opposite end portions of a frame 16 fabricated from magnetic material, with the coils disposed at opposite sides of the shaft 12 as seen best in Figure 2. The frame comprises flat upper and lower plates 17 and 18, respectively, held in spaced apart parallel relationship by inverted U-shaped spacers 19. The bight portion 20 of each of the spacers is engaged flatwise with the underside of the top plate 17 at the ends of the frame, and the parallel legs 21 of the spacers extend perpendicularly downwardly therefrom to abut the flat upper side of the lower plate or base 18 of the frame. The spacers are fixed to the upper plate 17 as by welded connections between the plate and their bight portions 20, while the legs of the spacers are fixed to the lower plate or base 18 as by tongues 22 passing through notches therein and peened over against the underside of the base as at 23.

Each of the coils 15 is mounted on the frame inside one of the U-shaped spacers 19 with its sides embraced by the legs 21 of the spacer, and as will be more fully disclosed hereinafter the spacers cooperate with the base 18 to provide a magnetic circuit around the coils.

The lower plate or base 18 of the frame has a hub 25 fixed thereto on its inner surface to receive the shaft 12, and the frame is fixed to the shaft as by means of a set screw 26 threaded into the wall of the hub with its inner end bearing against the exterior of the shaft. Consequently the frame oscillates with the shaft 12 whenever the mechanism to be controlled is in operation.

Since the coils 15 are substantially identical, the following description of one will suffice for both. The coil is wound upon a spool-type bobbin 28 of insulating material (such as Bakelite) having a tubular core 29, circular in cross section. The bobbin is disposed upon the frame with its core 29 perpendicular to the upper and lower plates 17 and 18 of the frame, and with the lower flanged end 30 of the bobbin resting flatwise on the upper surface of the base 18 of the frame. The core 29 of the bobbin provides a guide in which a cylindrical plunger 32 is slidably received for endwise reciprocatory motion therein, the outer end of the plunger passing through an opening 33 in the frame which is slightly larger in diameter than the plunger.

Energization of the coil 15, therefore, causes the plunger 32 to be attracted upwardly into the coil to a seated position defined by the engagement of the inner end of the plunger with a magnetically permeable end stop 35 fixed to the upper plate 17 of the frame and projecting a substantial distance downwardly into the upper end of the bobbin core. A resilient gasket 36 confined between the bight of the spacer and the top flange of the bobbin serves to hold the bobbin pressed downwardly onto the base 18.

The plunger 32 of the solenoid has a relatively wide and deep slot 41 in its outer end portion, extending diametrically thereacross so as to define bifurcations on the plunger which embrace the shift rod 13. A cross pin 42 anchored in the bifurcations of the plunger and extending across the slot 41 therein on an axis normal to the plunger axis is engageable in either an upper horizontally elongated slot 44 or a lower horizontally elongated slot 45 in the shift rod 13, depending upon whether the solenoid is energized or deenergized. The slots 44 and 45 in the shift rod are offset horizontally as well as vertically from one another so that as viewed in Figure 1 the right end of the upper slot is directly above the left end of the lower slot. The adjacent ends of these slots are communicated by a vertical connecting slot 46, and the length of each horizontal slot substantially corresponds to the length of the arc described by the plunger 32 during oscillation of the solenoid frame.

With the solenoid deenergized as shown in Figures 1 and 2, the plunger 32 of the solenoid is in its lowermost position with its cross pin 42 engaged in the lower slot 45 of the shift rod. Consequently, during oscillation of the solenoid frame, the pin 42 rides back and forth in the slot 45, the full length thereof, without imparting motion to the rod. Upon energization of the coil, however, its plunger 32 tends to move upwardly, but such motion of the plunger is delayed until the oscillatory movement of the frame has carried the cross pin to the left hand end of the lower slot 45 thus aligning it with the connecting slot 46. The plunger can then move upwardly carrying the pin 42 thereon into the right hand end of the upper slot 44 to effect shifting of the shift rod 13 to the right upon retrograde oscillatory movement of the solenoid frame.

With the shift rod actuated to the right in this manner the solenoid continues to oscillate while the cross pin 42 in the outer end of its plunger slides freely back and forth in the slot 44, without imparting any further horizontal motion to the rod, until the coil is deenergized.

Deenergization of the coil releases the plunger for downward travel, which is again delayed until the oscillatory movement of the frame has carried the cross pin 42 to the right hand end of the upper slot and into alignment with the vertical connecting slot 46. The plunger then drops and the subsequent oscillatory stroke of the solenoid effects shifting of the rod 13 to the left.

It will be seen from the description of the manner in which the shift rod 13 is actuated, that the solenoid of this invention acts as a coupling device through which oscillatory motion of the shaft 12 is transmitted to the shift rod to move the same in one direction or the other depending upon whether the solenoid is energized or deenergized.

It will also be apparent that because of its coupling function, substantial sidewise thrust is at times imposed upon the plunger of the solenoid, and that the slot 41 in the outer end of the plunger of the solenoid must have a relatively great depth to accommodate the height of the shift rod. In the seated position of the plunger defined by the engagement of its inner end with the end stop 35, the bottom 48 of the plunger slot lies inwardly of the base 18 of the frame and only the bifurcated outer end of the plunger is in direct flux transfer relationship to the frame.

In the past this condition has resulted in high reluctance in the magnetic circuit about the coil defined by the U-shaped spacer, the base 18 of the frame and the plunger with its end stop. In other words, the plunger slot so reduced the cross section of that portion of the plunger occupying the frame opening in the attracted position of the plunger, that a flux bottleneck was created in the magnetic circuit at the frame opening. The resulting high reluctance in the magnetic circuit thus reduced the efficiency of the solenoid.

Because of the fact the opening 33 in the base of the frame has a somewhat larger diameter than that of the plunger, the plunger does not receive guidance from the frame, and any side thrust imposed upon the plunger would be transmitted directly into the tubular core of the bobbin. Because the bobbin is made of relatively fragile insulating material, it cannot satisfactorily withstand substantial side thrust forces at times imposed upon it by the plunger in consequence of shifting gears.

In the solenoid of this invention, the side thrust imposed upon the plunger is carried directly into the base 18 of the frame to assure against damage to the bobbin. For this purpose, the tubular bobbin core has a bushing 37 received in a counterbore 38 in its lower end. The bushing projects downwardly out of the bobbin and into the opening 33 in the base 18 of the frame and has intimate contact with the sides of the opening. This bushing is in the form of a thin sleeve having its upper end seated against the bottom of the counterbore 38 in the bobbin and its lower end seated upon ledges 39 in the frame opening 33 formed by staking portions at the underside of the base into the opening, as at 40.

The bore of the bushing substantially corresponds to that of the tubular core of the bobbin so that the bushing cooperates therewith to guide the endwise sliding motion of the plunger in the coil; and because its lower end is in effect anchored in the base 18, the bushing cooperates with the end stop 35 to hold the coil against shifting laterally on the frame.

While this sleeve-like bushing may be of non-magnetic material such as brass to provide a good sliding bearing for the plunger, it is preferably made of a magnetically permeable material having an inner lining 37' of brass, copper or any other suitable non-magnetic material which provides a good bearing surface for the plunger and prevents magnetic sticking of the plunger thereto.

It is advantageous to have at least the outer lamina of the bushing formed of magnetically permeable metal because the bushing then provides in effect an extension of the base 18, surrounding the plunger and extending upwardly beyond its bifurcations to encircle unslotted portions of the plunger thereabove. Consequently flux can flow from the base into the bushing and into these unslotted portions of the plunger to thus eliminate the flux bottleneck which would otherwise exist because of the large slot 41 in the plunger.

To avoid any tendency for the bushing 38 to act as a short circuiting winding of low resistance capable of generating a flux field counter to that of the coil which might reduce the efficiency of the solenoid and cause heating, the bushing has a slit 48 extending the entire length thereof. It will be apparent, of course, that the bushing may be formed of laminated stock cut into strips and rolled up to substantially circular shape with the ends of the strip spaced slightly from one another to define the slit 48.

As brought out hereinbefore, the solenoid of this invention is generally equipped with two coils each having a plunger to operate a shift rod, one of which rods may control transmission gearing and the other of which may perform any other function such as the actuation of a switch or the opening and closing of a valve. In the instrumentality disclosed in Figures 1 to 4 inclusive, right and left hand coils are provided, the difference being in the positions of their terminals 49 which are inclined toward one another to facilitate connection thereof to supply conductors, not shown. These conductors are led downwardly toward the coils through a grommet 50 in the top plate 17 of the frame.

In the embodiment of the invention shown in Figures 5 and 6, however, the two coils are identical. Each of the bobbins is provided with identical counterbores 38 and 38' in its lower and upper ends, respectively, either of which is capable of receiving the bushing 37 so that either end of the bobbin may be disposed lowermost, depending upon the required terminal disposition. The upper counterbore 38' receives the main or body portion 52 of the end stop, the stop portion 53 being slightly reduced in diameter to fit the bore of the tubular bobbin core. A rubber gasket 54 may be confined between the body portion 52 and the bottom of the counterbore 38' to effect yielding clamping of the bobbin against the base 18 of the frame.

Also in this embodiment of the invention the end stop projects through aligned openings 56 in the bight of the U-shaped spacer and the top plate 17 of the frame and is fixed to a disc 57 overlying the top plate 17 of the frame to which the disc is detachably secured as by screws 58 passing through the disc and the top plate and threading into the bight of the U-shaped spacer.

Attention is directed to the fact that the end stop 52 cooperates with the bushing 38 in this embodiment of the invention to firmly hold the coil in place on the frame, and that the bobbin upon which the coil is wound has a length slightly less than the space between the base 18 and the bight of the U-shaped spacer. This space 60 allows sufficient upward endwise movement of the bobbin when the end stop 52 is detached, as seen in Figure 6, to enable the bushing 37 in the lower end of the bobbin to be withdrawn upwardly from the hole 33 in the base 18 with the bobbin, thus permitting lateral removal of the coil from between the legs of the U-shaped spacer for replacement by another coil.

The provision of counterbores in both ends of the bobbin also greatly facilitates manufacture of the solenoids of this invention and eliminates the need for stocking quantities of right and left hand coils. When servicing the solenoid of Figures 5 and 6 in the field it is only necessary to remove the burned out coil in the manner described, and replace it with a new coil, inserting a new bushing in whichever end of its bobbin is required for the proper arrangement of the terminal connections 49 on the exterior of the coil.

In the embodiment of the invention shown in Figure 7 the base 18 of the frame is provided with a ledge 39' extending continuously about the plunger opening therein and facing inwardly to have abutting engagement with the outer end of the bushing 37. This, of course, requires the plunger opening in the frame to be provided by a bore 33' slightly larger in diameter than the plunger to clear the same and a counterbore 62 of a size corresponding to that of the opening 33 of the previously described embodiment of the invention to snugly receive the outer end of the bushing 37.

This manner of providing the plunger opening in the base of the frame, however, is somewhat more expensive than that previously described in which the ledges 39 are provided by a staking operation carried out simultaneously with the punching operation whereby the opening 33 for the plunger is formed.

From the foregoing description taken together with the accompanying drawings it will be apparent that this invention provides a readily replaceable solenoid especially suited for the electromagnetic control of such mechanisms as washing machine transmissions and the like, and in which the provision of a bushing for the plunger, carried jointly by the bobbin and the base of the solenoid frame eliminates flux bottlenecks in the magnetic circuit around the coil and protects the bobbin from damage which would otherwise result by reason of the side thrust imposed upon the plunger of the solenoid during operation of the device.

What we claim as our invention is:

1. In a solenoid: a tubular non-magnetic coil support; a coil encircling and seated upon said tubular support; magnetically permeable frame means including opposite side members extending lengthwise along the exterior of the coil, and end portions connected to said side members and overlying the opposite ends of the coil support and confining the coil support against axial shifting relative to the frame means, one of said end portions of the frame means having a plunger opening therein coaxial with the tubular support; a magnetically permeable plunger received in and slidably guided by said tubular support and projecting therefrom through said opening in the frame means; a plunger stop on the opposite end portion of the frame means projecting into the coil support to hold the same against sidewise shifting on the frame, said stop being engageable by the plunger to define the attracted position thereof; a sleeve-like bushing received in a counterbore in the coil support at the end thereof remote from the plunger stop and projecting axially from the coil support to have its outer end portion snugly received in the plunger opening of the frame means so that the bushing cooperates with the plunger stop to hold the coil support against lateral shifting on the frame means, said bushing having an inside diameter substantially equal to that of said tubular support and cooperating with the coil support to guide the sliding motion of the plunger therein, and to transmit side thrust imposed on the plunger directly into the frame means to protect the coil support against damage; and an abutment on the frame means adjacent to the plunger opening engaged by the bushing and cooperating with the bottom of the counterbore in the coil support to hold the bushing against axial displacement out of the plunger opening.

2. In a solenoid of the character described: a tubular coil support having identical counterbores in its opposite ends; a coil wound upon and encircling said support; a magnetically permeable frame encircling the coil and its support and having end portions overlying the opposite ends of the support, one of said end portions of the frame being spaced from the adjacent end of the coil support and the other of said end portions having a plunger opening therein; a plunger slidable endwise in the coil support and projecting therefrom through said opening in the frame; a plunger end stop detachably secured to said first designated end portion of the frame and projecting into the adjacent counterbore in the coil support to substantially fill the same and thereby hold the coil spaced from the adjacent end portion of the frame and engaged against said other end portion of the frame, and to hold the coil against lateral shifting on the frame; and a bushing for the plunger to guide the sliding motion thereof axially of the coil support, said bushing having one end snugly received in said opening of the frame and its other end portion projecting into the adjacent counterbore in the coil support to cooperate with the end stop in holding the coil against shifting on the frame, the coil and its support being removable from the frame upon detachment of the end stop therefrom to allow endwise displacement of the coil support the distance necessary to separate the coupling between the coil support and the frame normally provided by the bushing.

3. In a solenoid: an insulative coil support having a tubular portion and a flange at each end thereof disposed substantially normal to the axis of the tubular portion; a coil encircling said tubular portion, between the flanges; magnetically permeable frame means including opposite side members extending lengthwise along the exterior of the coil, and end members connected to said side members and overlying the opposite ends of the coil support, said end members of the frame means being spaced apart a distance greater than the length of the coil support, and one of said end members having a plunger opening therein; a bushing confined in an inwardly opening counterbore in said one end frame member, concentric with the plunger opening therein, and in an outwardly opening counterbore in the adjacent end of the tubular portion of the coil support and with its ends engaged with the bottoms of the counterbores; a plunger stop extending from the other end member of the frame into said tubular portion of the coil support and cooperating with said bushing to hold the coil support against lateral displacement; a resilient ring interposed between said other end member of the frame and the tubular portion of the coil support and through which the coil support is held clamped between the end members of the frame and thereby restrained against axial motion with respect to the frame, said resilient ring cooperating with said bushing to carry endwise clamping stresses solely into the tubular portion of the coil support and thus avoiding the application of force to the flanges; and a plunger slidable endwise in the tubular portion of the coil support, through said plunger opening in the frame, said plunger being partially guided in its axial motion by said bushing which transmits lateral forces upon the plunger into the frame.

References Cited in the file of this patent

UNITED STATES PATENTS

| 2,217,141 | Sprenkle | Oct. 8, 1940 |
| 2,278,967 | Allen | Apr. 7, 1942 |
| 2,343,806 | Scofield | Mar. 7, 1944 |
| 2,358,999 | Ray | Sept. 26, 1944 |
| 2,405,396 | Bazley | Aug. 6, 1946 |
| 2,407,963 | Persons | Sept. 17, 1946 |

FOREIGN PATENTS

| 592,320 | Great Britain | Mar. 10, 1948 |